United States Patent
Basilico

(10) Patent No.: US 7,272,074 B2
(45) Date of Patent: Sep. 18, 2007

(54) SYSTEM AND METHOD FOR EXTENDING GPS TO DIVERS AND UNDERWATER VEHICLES

(76) Inventor: Albert R. Basilico, 14025 Bingham Dr., Raleigh, NC (US) 27614

( * ) Notice: Subject to any disclaimer, the term of this patent is extended or adjusted under 35 U.S.C. 154(b) by 236 days.

(21) Appl. No.: 11/182,894

(22) Filed: Jul. 15, 2005

(65) Prior Publication Data

US 2007/0014189 A1  Jan. 18, 2007

(51) Int. Cl.
*G01S 3/80* (2006.01)
(52) U.S. Cl. ..................... 367/128
(58) Field of Classification Search ............ 367/128; 342/357.06, 357.14; 701/213
See application file for complete search history.

(56) References Cited

U.S. PATENT DOCUMENTS

| | | |
|---|---|---|
| 3,853,081 A | 12/1974 | Daudelin et al. |
| 3,944,967 A | 3/1976 | Acks et al. |
| 3,986,161 A | 10/1976 | MacKellar |
| 4,315,263 A | 2/1982 | Neidell |
| 4,558,439 A | 12/1985 | Güdesen |
| 4,604,733 A | 8/1986 | Brown et al. |
| 4,622,557 A | 11/1986 | Westerfield |
| 5,038,406 A | 8/1991 | Titterton et al. |
| 5,077,703 A | 12/1991 | Strauss |
| 5,079,753 A | 1/1992 | Suggs |
| 5,119,341 A | 6/1992 | Youngberg |
| 5,148,412 A | 9/1992 | Suggs |
| 5,185,725 A | 2/1993 | Kent et al. |
| 5,187,871 A | 2/1993 | McDermott |
| 5,303,206 A | 4/1994 | Bemb et al. |
| 5,331,602 A | 7/1994 | McLaren |
| 5,369,623 A | 11/1994 | Zerangue |
| 5,570,323 A | 10/1996 | Prichard et al. |
| 5,579,285 A | 11/1996 | Hubert |
| 5,659,520 A | 8/1997 | Watson et al. |
| 5,668,775 A | 9/1997 | Hatteland |
| 5,708,626 A | 1/1998 | Hrubes |
| 5,761,153 A | 6/1998 | Gikas et al. |
| 5,784,339 A | 7/1998 | Woodsum et al. |
| 5,899,204 A | 5/1999 | Cochran |
| 6,016,119 A | 1/2000 | Krasner |
| 6,064,942 A | 5/2000 | Johnson et al. |
| 6,163,503 A | 12/2000 | Gudbjornsson |
| 6,327,220 B1 | 12/2001 | Miller, Jr. et al. |
| 6,377,515 B1 | 4/2002 | Healey |
| 6,396,432 B1 | 5/2002 | Riemschneider et al. |
| 6,512,478 B1 | 1/2003 | Chien |
| 6,625,083 B2 | 9/2003 | Vanderbroucke |
| 6,662,742 B2 | 12/2003 | Shelton et al. |

(Continued)

*Primary Examiner*—Dan Pihulic
(74) *Attorney, Agent, or Firm*—Coats & Bennett, P.L.L.C.

(57) ABSTRACT

A navigation system extends satellite navigation to divers. The navigation system comprises a surface unit and a plurality of sub-surface beacon units. The surface unit includes a receiver to receive navigation signals from earth-orbiting satellites, processing circuits to communicate with to sub-surface beacon units and to transmit location information to said sub-surface beacon units, and a sonar transmitter to transmit location information to the sub-surface beacon units. The beacon units include a processing circuits to determine the location of the beacon unit based on location information received from the surface unit, and a sonar transceiver to receive location information from the surface unit while the surface unit is floating on the surface; and to transmit location information to a diver unit to provide navigation assistance to the diver unit.

29 Claims, 6 Drawing Sheets

U.S. PATENT DOCUMENTS

| | | |
|---|---|---|
| 6,665,631 B2 | 12/2003 | Steinbrecher |
| 6,690,618 B2 | 2/2004 | Tomasi et al. |
| 6,771,563 B1 | 8/2004 | Bernard |
| 6,791,490 B2 | 9/2004 | King |
| 6,807,127 B2 | 10/2004 | McGeever, Jr. |
| 6,816,437 B1 | 11/2004 | Teller et al. |
| 2002/0097184 A1 | 7/2002 | Mayersak |
| 2002/0140599 A1 | 10/2002 | King |
| 2003/0117893 A1 | 6/2003 | Bary |
| 2003/0135326 A1 | 7/2003 | Brown |
| 2003/0222820 A1 | 12/2003 | Karr et al. |
| 2004/0068371 A1 | 4/2004 | Estep |
| 2004/0155815 A1 | 8/2004 | Muncaster et al. |
| 2004/0196180 A1 | 10/2004 | Hollis et al. |
| 2004/0220722 A1 | 11/2004 | Taylor |
| 2004/0230373 A1 | 11/2004 | Tzamaloukas |
| 2004/0230374 A1 | 11/2004 | Tzamaloukas |
| 2004/0233784 A1 | 11/2004 | Bernard |
| 2006/0215494 A1* | 9/2006 | Thomas ............... 367/128 |
| 2007/0014189 A1* | 1/2007 | Basilico ............... 367/128 |

* cited by examiner

SYSTEM AND METHOD FOR EXTENDING GPS TO DIVERS AND UNDERWATER VEHICLES

BACKGROUND OF THE INVENTION

The present invention relates generally to underwater navigational and, more particularly, to a method and apparatus for extending GPS navigation to divers and underwater vehicles.

Satellite-based positioning systems, such as the Global Positioning System (GPS), provide the ability to accurately determine location virtually almost anywhere on the Earth's surface. The GPS comprises 24 earth-orbiting satellites located in 6 orbital planes. Each earth-orbiting satellite carries an atomic clock and continuously broadcasts radio signals indicating its current time and location. A receiver located on the Earth's surface can receive these radio signals and determine its distance from the satellites based on the time of arrival of the signals. By receiving signals from four satellites, an Earth-based receiver can determine its location by triangulation.

GPS signals do not propagate underwater. Consequently, divers and underwater vehicles beneath the water's surface are not able utilize these GPS signals to accurately navigate between two points. A number of systems have been proposed for extending GPS to underwater divers and vehicles. For example, U.S. Pat. No. 6,701,252 to Brown and U.S. Pat. No. 6,657,585 to Kucik disclose a floating buoy that is connected by a tether to a diver or underwater vehicle. The floating buoy carries a GPS antennas and/or receiver and conveys signals via the tether to the diver or underwater vehicle. This solution is limited in utility by the need for a tether connecting the underwater diver or vehicle to the floating buoy. U.S. Pat. No. 5,119,341 to Youngberg discloses a system for extending GPS to divers and vehicles beneath the water's surface using buoys that float freely on the surface. The floating buoys can receive signals from GPS satellites and can communicate underwater users using acoustic signals. However, the floating buoys do not stay in place, but instead drift on the surface of the water. Further, floating buoys are subject to easy detection and thus are not suitable for covert operations.

SUMMARY OF THE INVENTION

The present invention provides an underwater navigation system that effectively extends GPS to underwater users. The underwater navigation system comprises a plurality of sub-surface beacon units that are designed to sink to the ocean bottom and at least one floating buoy or surface unit. The surface unit includes a GPS receiver for receiving GPS signals. The surface unit communicates with the sub-surface beacon units via acoustic signals. The beacon units and surface unit are dropped in an area where navigation assistance is needed. The beacon units are designed to sink immediately to the ocean bottom. The surface unit floats on the surface long enough for the beacon units to determine their positions and then sinks to the bottom. While the surface unit is floating on the surface, it receives GPS signals from the GPS satellites and determines its location. After its location is fixed, the surface unit transmits its location to each of the sub-surface beacon units. The beacon units can determine their location based on the signals received from the surface unit and/or signals received from other beacon units. The surface unit sinks after a predetermined period of time or after the surface unit receives a position confirmation from a predetermined number of beacon units.

DETAILED DESCRIPTION OF THE INVENTION

Figure 1:
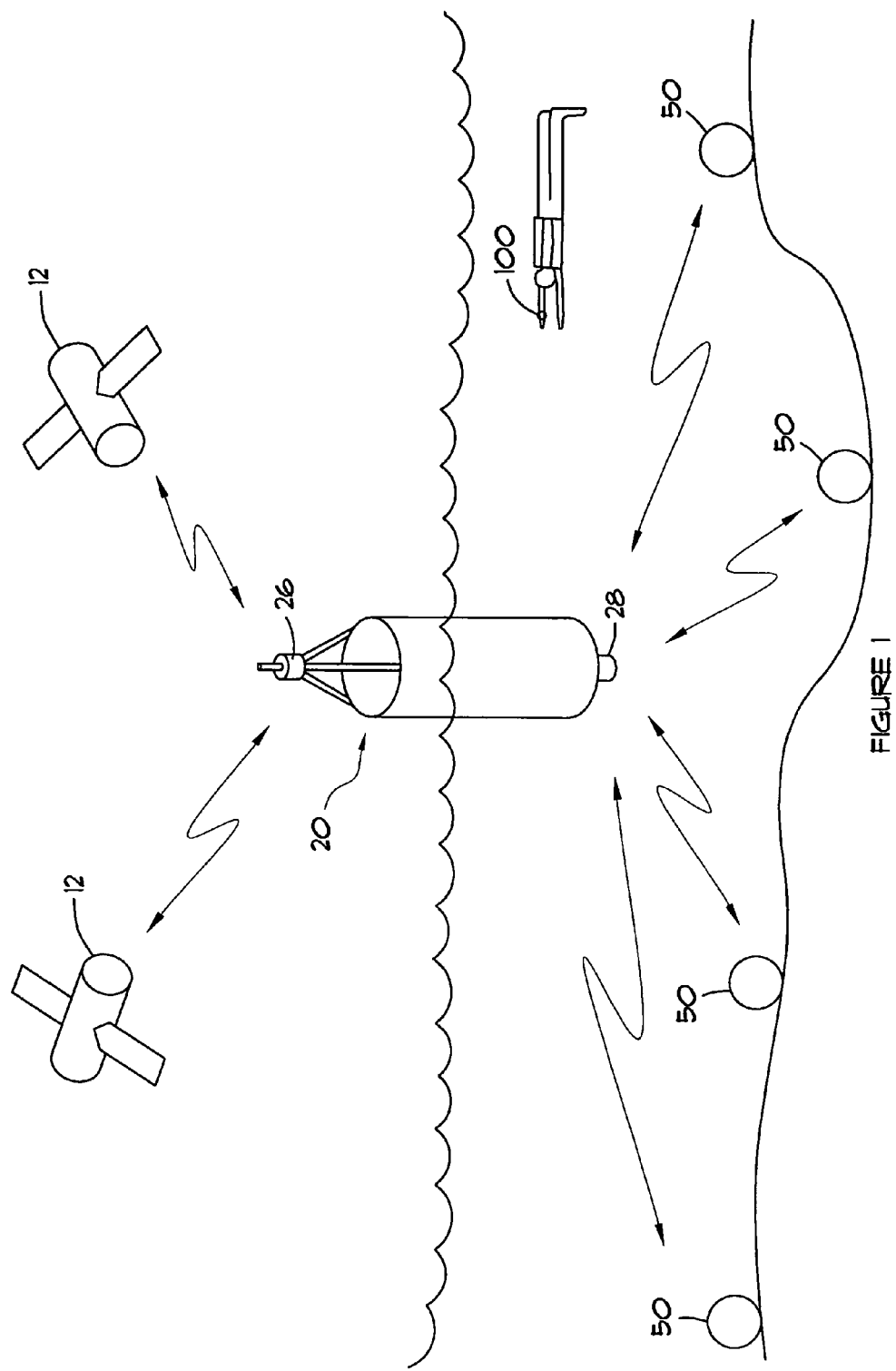
FIG. 1 illustrates an exemplary embodiment of the underwater navigation system according to the present invention.

Referring now to the drawings, FIG. 1 illustrates an underwater navigation system 10 to provide navigation assistance to a diver or underwater vehicle. The underwater navigation system 10 comprises at least one surface unit 20 that communicates with earth-orbiting satellites 12 and a plurality of beacon units 50 located beneath the water's surface that communicate with the surface unit 20. The surface unit 20 includes a GPS receiver 26 for receiving GPS signals from GPS satellites 12. The surface 20 communicates with the sub-surface beacon units 50 using acoustic signals.

The beacon units 50 and surface unit 20 are dropped in an area where navigation assistance is needed. The beacon units 50 are designed to sink immediately to the ocean floor. The surface unit 20 floats on the surface long enough for the beacon units 50 to determine its positions as hereinafter described and then sinks to the bottom. While the surface unit 20 is floating on the surface, it receives GPS signals from the GPS satellites 12 and determines their location. After its location is fixed, the surface unit 20 transmits its location to each of the beacon units 50. The beacon units 50 can then determine their location based on signals received from one or more surface units 20. In some embodiments, the beacon units 50 may determine their location based on signals received from a single surface unit 20. In other embodiments, the beacon units 50 may receive signals from multiple surface units 20. The beacon units 50 may also exchange information between themselves to further refine position calculations. After the location of the beacon unit 50 is determined, the beacon units 50 can provide navigation assistance to diver units 100.

Figure 2:
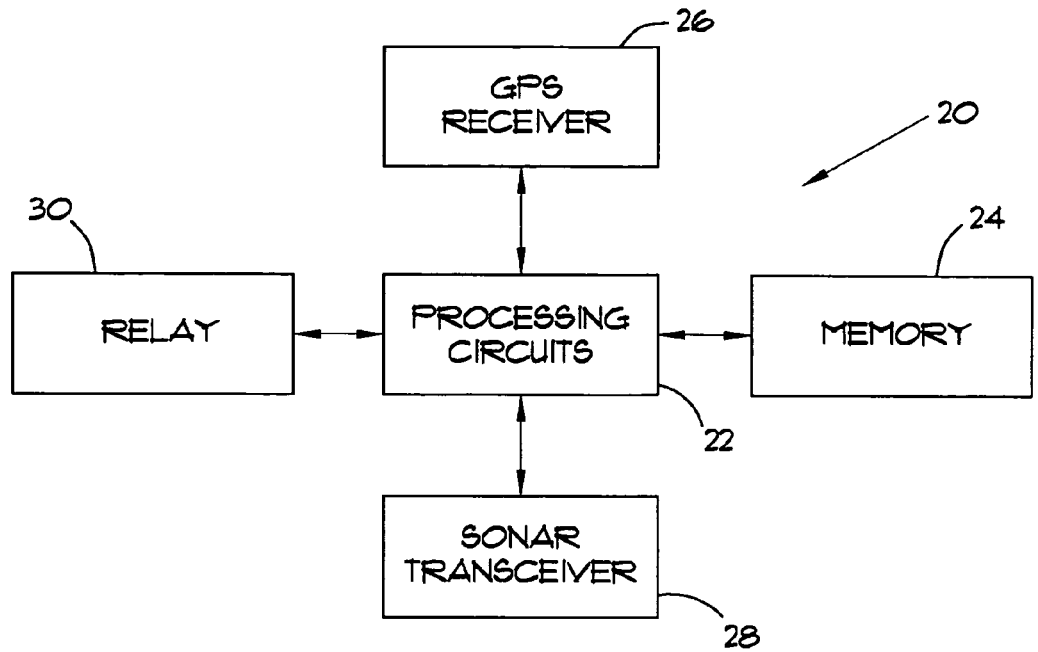
FIG. 2 illustrates an exemplary surface unit for the underwater navigation system.

FIG. 2 illustrates the main components of the surface unit 20. The surface unit 20 comprises processing circuits 22, memory 24, a GPS receiver 26, a sonar transceiver 28, and a relay 30. The processing circuits 22 control overall operation of the surface unit 20, process position signals received by the GPS receiver 26, and generate information and control signals to be transmitted to the beacon units 50 via sonar transceiver 28. Processing circuits 22 also process information and control signals received from the beacon units 50. Memory 24 stores program instructions and data needed for operation. Sonar transceiver 28 is used for underwater communications with beacon units 50. Relay 30 is actuated by the processing circuit 22 to sink the surface unit 50 after the beacon units 50 have established their positions. For example, actuation of the relay 30 may cause floatation devices to detach from the surface unit 20, thus allowing surface unit 20 to sink. Alternatively, relay 30 may open a valve, allowing ocean water to flood a ballast tank, thereby causing the surface unit 20 to sink.

Figure 3:
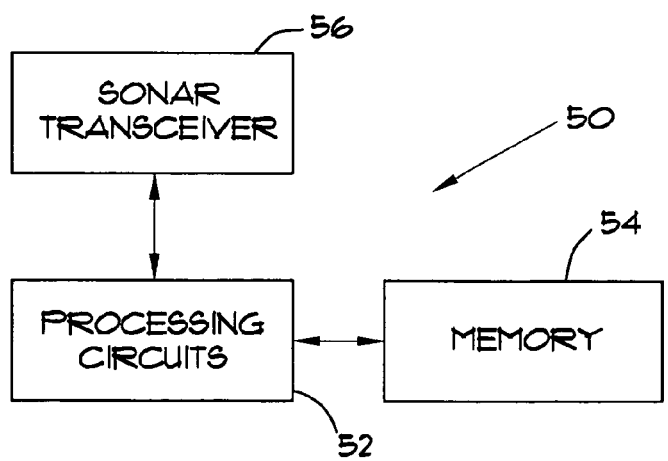
FIG. 3 illustrates an exemplary beacon unit for the underwater navigation system.

FIG. 3 illustrates the main components of the beacon unit 50. Beacon unit 50 comprises processing circuits 52, memory 54, and a sonar transceiver 56. Processing circuits 52 control the overall operation of the beacon unit 50, and process information and control signals received from the surface unit 20, other beacon units 50 and diver units 100. Memory 54 stores program instructions and data needed for operation. Sonar transceiver 56 is used for underwater communications with the surface unit 20, other beacon units 50, and diver units 100.

When the beacon units 50 are initially deployed, the beacon units 50 must determine their position after sinking to the ocean floor. While dropping to the ocean floor, ocean currents may carry the beacon units 50 a substantial distance from the original drop zone. Therefore, it is not sufficient for the beacon units 50 to determine their location before sinking. As earlier noted, the beacon units 50 determine their location after reaching the ocean floor by exchanging messages with one or more surface units 20. Two basic approaches may be taken to determine the location of the beacon units 50.

The first approach is based on the calculation of the distance from the beacon unit 50 to multiple surface units 20. At least four surface units 20 are needed to accurately determine the location of the beacon unit 50 using this method. Each surface unit 20 determines its location based on receipt of GPS signals and transmits its location to the beacon unit 50. The distance of the beacon unit 50 from each surface unit 20 is also determined. The distance may be determined by the surface units 20 and transmitted to the beacon units 50, or may be determined by the beacon units 50 themselves. Based on the distance of the beacon unit 50 from the surface units 20 and the location of the surface units 20, the beacon unit 50 can determine its location accurately by triangulation. The beacon unit's position will be the intersection of four spheres with the surface units 20 at the center of respective spheres.

The second approach requires only one surface unit 20. In the second approach, the surface unit 20 determines its location based on receipt of GPS signals and transmits its location to the beacon unit 50. The beacon unit 50 determines the direction and distance to the surface unit 20. With knowledge of the surface unit's location and the vector extending between the surface unit 20 and the beacon unit 50, the beacon unit 50 can accurately determine its location.

Various techniques can be used for determining the distance between the surface unit 20 and beacon unit 50. Three exemplary methods for determining distance are described below. These three methods are referred to herein as the time of arrival method, the time of travel method, and the dual tone method. Those skilled in the art will appreciate that the present invention is not limited to the methods enumerated herein and that other methods may be used for determining distance.

The time of arrival method requires clock synchronization between the surface unit 20 and beacon unit 50. In this method, the beacon unit 50 sends a message to the surface unit 20 requesting the surface unit 20 to transmit a response message at a time known to the beacon unit 50. The request or response message may specify the transmit time, or the transmit time may be specified by a protocol. For example, the protocol may specify that the surface unit 20 transmit a response message only when the m least significant bits of the surface unit's clock are all 0. Because the clocks are synchronized, the beacon unit 50 can use the time of arrival of the signal to compute the distance to the surface unit 20.

The time of travel method does not require clock synchronization. In this method, the beacon unit 50 sends a message to the surface unit 20. Upon receipt of the message by the surface unit 20, the surface unit 20 generates and sends a reply message to the beacon unit 50. The reply message includes a delay value indicating the delay between the time the first message was received at the surface unit 20 and the time that the reply message was sent. The beacon unit 50 may use the round trip time and the turnaround delay to compute the distance to the surface unit 20.

The dual tone method uses the fact that acoustic signals transmitted at different frequencies will travel at different speeds through water. In this method, the beacon unit 50 sends a message to the surface unit 20 requesting the surface unit 20 to send a dual tone signal. In response, the surface unit 20 transmits a dual tone signal comprising two distinct tones with equal power. The power in each tone will attenuate as a known function of the distance traveled. With knowledge of the attenuation rate for each tone component, the beacon unit 50 can compute distance to the surface unit 20 based on the difference in the received power of the tone components.

Those skilled in the art will appreciate that the operations of the beacon unit 50 and surface unit 20 in the distance calculation could be reversed. That is, the surface unit 20 could compute the distance to the beacon unit 50 and transmit the distance to the beacon unit 50.

To determine the direction to the target, the sonar transceiver for the beacon unit 50 comprises an array of sonar transducers. Assuming that the rate of travel of a signal in water is known, the beacon unit 50 can compute the direction to the surface unit 20 based on the time difference of arrival of a signal transmitted by the surface unit 20 at each of the sonar transducers. This technique is similar to the way that a GPS receiver determines its location.

During deployment of the beacon units 50, the surface unit 20 acts as a master unit and controls communication with the beacon units 50. The beacon units 50 sink to the ocean floor and remain silent until activated by the surface unit 20. The surface unit 20 may activate the beacon units 50 one at a time by sending an activation code to the beacon unit 50. After waking, the beacon unit 50 determines its location as previously described by exchanging signals with the surface unit 20. Once the beacon unit 50 has determined its position, the beacon unit 50 may send a confirmation message to the surface unit 20. The confirmation message indicates to the surface unit 20 that the beacon unit 50 has determined its location. The surface unit 20 can then send a de-activation code to the beacon unit 50 so that the beacon unit 50 returns to a sleep mode. In sleep mode, the transmitter of the beacon unit 50 is turned off, but the beacon unit 50 periodically activates the receiver to monitor for incoming messages. The beacon unit 50 will remain in an inactive mode or sleep mode until it receives an activation code.

After receiving a confirmation message from each one of the beacon units 50, or a minimum subset of beacon units 50, the surface unit 20 generates a control signal that causes the surface unit 20 to sink or self destruct. In one embodiment, the control signal activates a relay 30 that controls a mechanical system on the surface unit 20. For example, activation of the relay 30 may cause floatation devices attached to the surface unit 20 to detach, thus allowing the surface unit 20 to sink. In another embodiment, the relay 30 may open a valve, causing a ballast tank to flood with water. The particular mechanism employed to effectuate the sinking or destruction of the surface unit 20 is not a material aspect of the invention. Any known methods for sinking or destroying the surface unit 20 can be used.

After the beacon units 50 are deployed, the beacon units 50 can be used by divers or underwater craft to navigate. The diver carries a diver unit 100 that communicates with the previously-deployed beacon units 50. Each beacon unit 50 knows its location and can transmit its location to the diver unit 100. The methods described above for determining the location of the beacon units 50 can also be employed by the diver units 100 to determine their location. In this case, the beacon units 50 provide the location reference for the diver unit 100.

Figure 4:
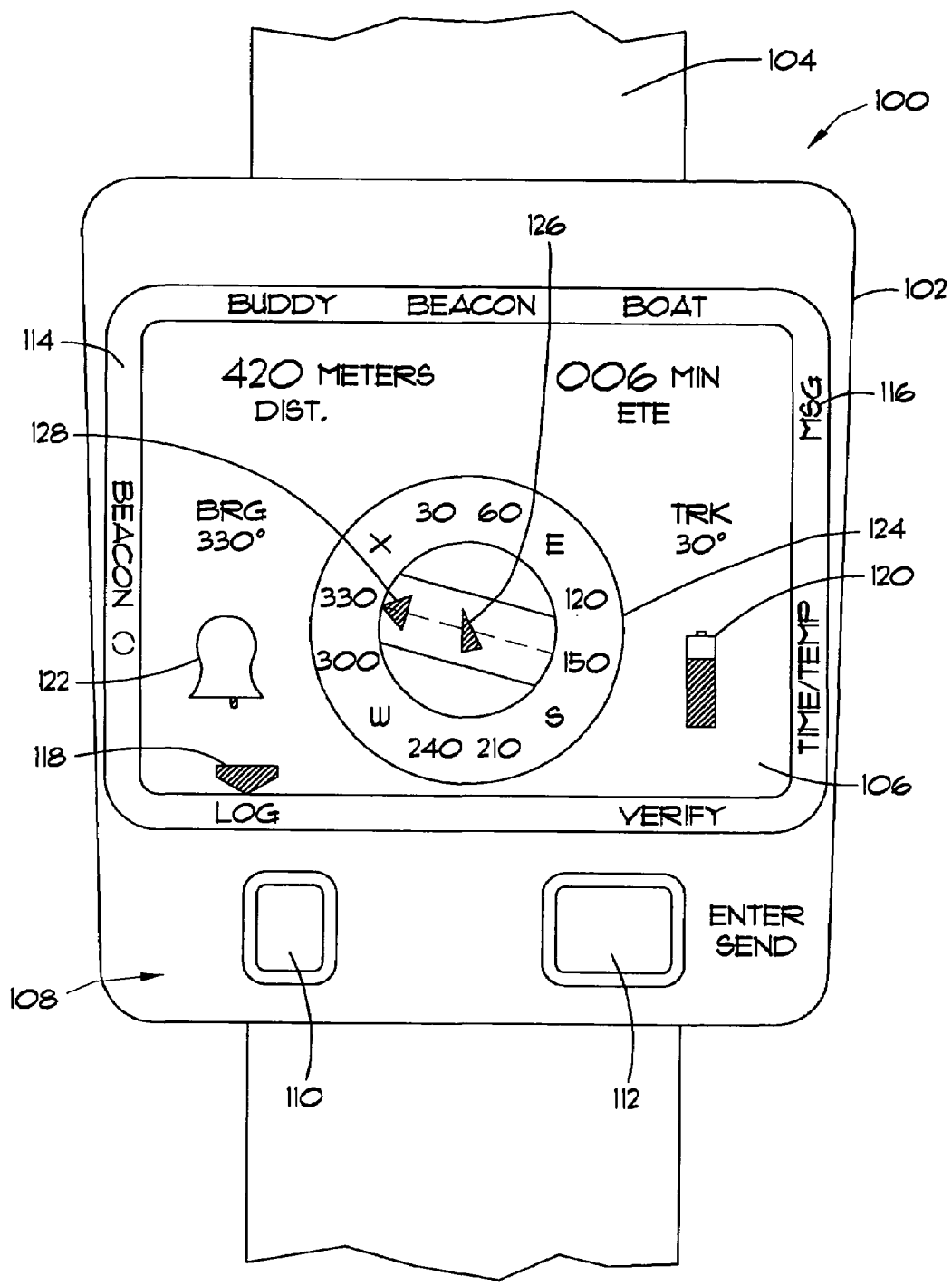
FIGS. 4 and 5 illustrate an exemplary diver unit for the underwater navigation system.
Figure 5:
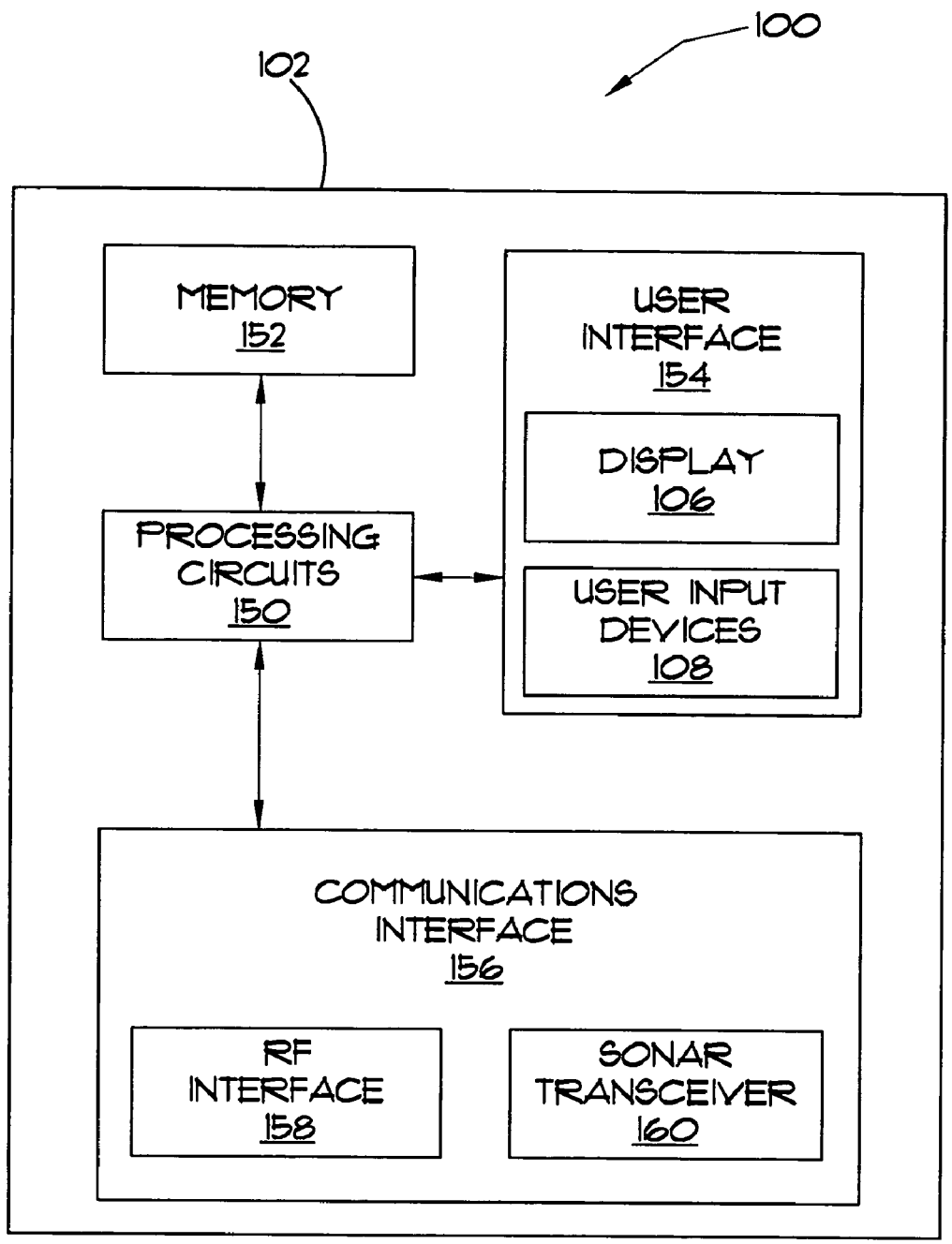

FIGS. 4 and 5 illustrate an exemplary diver unit 100. The diver unit 100 comprises a waterproof housing 102 mounted on a wristband 104. The diver unit 100 includes an electronic display 106, such as a liquid crystal display, and one or more input devices 108. The exemplary embodiment shown in FIG. 4 includes a scroll wheel 110 and a SEND/ENTER button 112. Those skilled in the art will recognize that other input devices, such as a joystick controller, keypad or touchpad, could be used for user input. Additionally, the display 106 may comprise a touchscreen display to receive user input.

The border 114 of the display 106 includes a series of labels 116 that describe various functions of the diver unit 100, e.g., "buddy," "beacon," etc. A function indicator 118 points to the currently selected function. In FIG. 4, the function indicator 118 indicates that the log function is selected. Additionally, display 106 may display other status indicators, such as power indicator 120 and alarm indicator 122, to provide the user with status information. The function indicator 118 can be moved to select a function by rotating the scroll wheel 110 and pressing the "ENTER/SEND" button 112. Selection of a function may change the operating mode of the diver unit 100. Scroll wheel 110 and button 112 may perform differently depending on the current operating mode. For example, after a function is selected, the scroll wheel 110 could be used to scroll through menu options or lists presented on the display 106.

In addition to status indicators, the display 106 is used to output useful information to the diver for viewing. In the exemplary embodiment, the display 106 can display a directional indicator 124. As will be described in more detail below, the directional indicator 124 is used to indicate direction to a target and the current track for navigating under water. In the embodiment shown, the directional indicator 124 includes a first pointer 126 showing the current track, and a second pointer 128 showing the direction to the target. The display 106 may also display numeric and alphanumeric data to the diver. In the exemplary embodiment shown in FIG. 4, the display 106 is displaying the distance to a target (DIST) (420 meters), the estimated time en route (ETE) (6 min), the bearing (BRG) to the target (330 degrees), and the current track (30 degrees). Other information, such as the current depth, current time, current temperature and the current latitude and longitude, or any other useful information could also be displayed. These examples are not intended to be a comprehensive list of all information that can be displayed, but merely illustrative of the types of information that may be displayed.

FIG. 5 is a functional block diagram illustrating the main components of the diver unit 100. The main components comprise processing circuits 150 for processing data and controlling operation of the diver unit 100, memory 152 for storing code and data used by the processing circuits 150, a user interface 154 that includes the display 106 and user input devices 108, and a communications interface 156. The processing circuits 150 may comprise one or more programmable processors, which may be general purpose microprocessors, microcontrollers, digital signal processors, or a combination thereof. Memory 152 represents the entire hierarchy of memory within the diver unit 100 and may comprise discrete memory devices, or may comprise internal memory in one or more microprocessors. The communications interface 156 comprises a radio interface 158 for use above water, and a sonar transceiver 60 for underwater communications. The radio interface may comprise, for example, a conventional BLUETOOTH, 802.11b, or 802.11g interface.

The diver units 100 use a request/response signaling scheme to communicate with beacon units 50. The diver units 100 send a request message to either a beacon unit 50 or another diver unit 100 to initiate a transaction. Response messages are sent in reply to request messages. More than one response message may be sent in reply to a request message. The request message and all corresponding response message constitute a transaction. In the exemplary embodiment, the beacon units 50 do not send request messages, but only send response messages in reply to request messages from the diver units 100. A multiple access schemes, such as frequency division multiple access, time division multiple access, or code division multiple access, may be used to enable communications between the beacon units 50 and multiple diver units 100.

When a diver unit 100 needs to determine its location, the diver unit 100 sends a request message containing an activation code to a beacon unit 50 to initiate communications with the beacon unit 50. The activation code may be encrypted to prevent unauthorized users from activating the beacon unit 50. The diver unit 100 may initiate communications with more than one beacon unit 50. After waking, the beacon unit 50 sends a reply message. The diver unit 100 can then send request messages to the beacon unit 50 to obtain navigation assistance. Exemplary uses of request messages include synchronizing clocks with a beacon unit 50 or establishing location. Once activated, the beacon unit 50 will remain awake until receipt of a deactivation code from the diver unit 100, or until a predetermined period of time has elapsed without any communications. While in an active or wake state, the beacon units 50 will receive and respond to request messages. Additionally, the beacon unit 50 may transmit a periodic signal while in the active state to enable diver units 100 to periodically update their location without the need to send an explicit request message to the beacon unit 50. For example, the beacon unit 50 may periodically transmit a periodic message containing a time stamp indicating when the periodic message was transmitted. If the diver unit clock is synchronized with the beacon unit clock, the periodic message can be used by the diver unit 100 to determine distance to the beacon unit 50. The periodic message could also be used to determine direction to the beacon unit 50. If the diver unit clock is not synchronized, the periodic message could be a dual tone signal so that the diver unit 100 can determine distance by the received power of the tone frequencies.

In one exemplary embodiment, a time division multiple access scheme is used to enable a plurality of diver units 100 to communicate with the beacon units 50 using the same frequency. TDMA divides the communication spectrum into sequential time slots that are used to transmit and/or receive data. A device transmits and/or receives only in its assigned time slot(s). The set of non-repeating time slots constitutes a frame. Normally, a frame is a fixed-length. In the present invention, the frame is a variable length frame that accommodates propagation delays between diver units 100 and beacon units 50.

Figure 6:
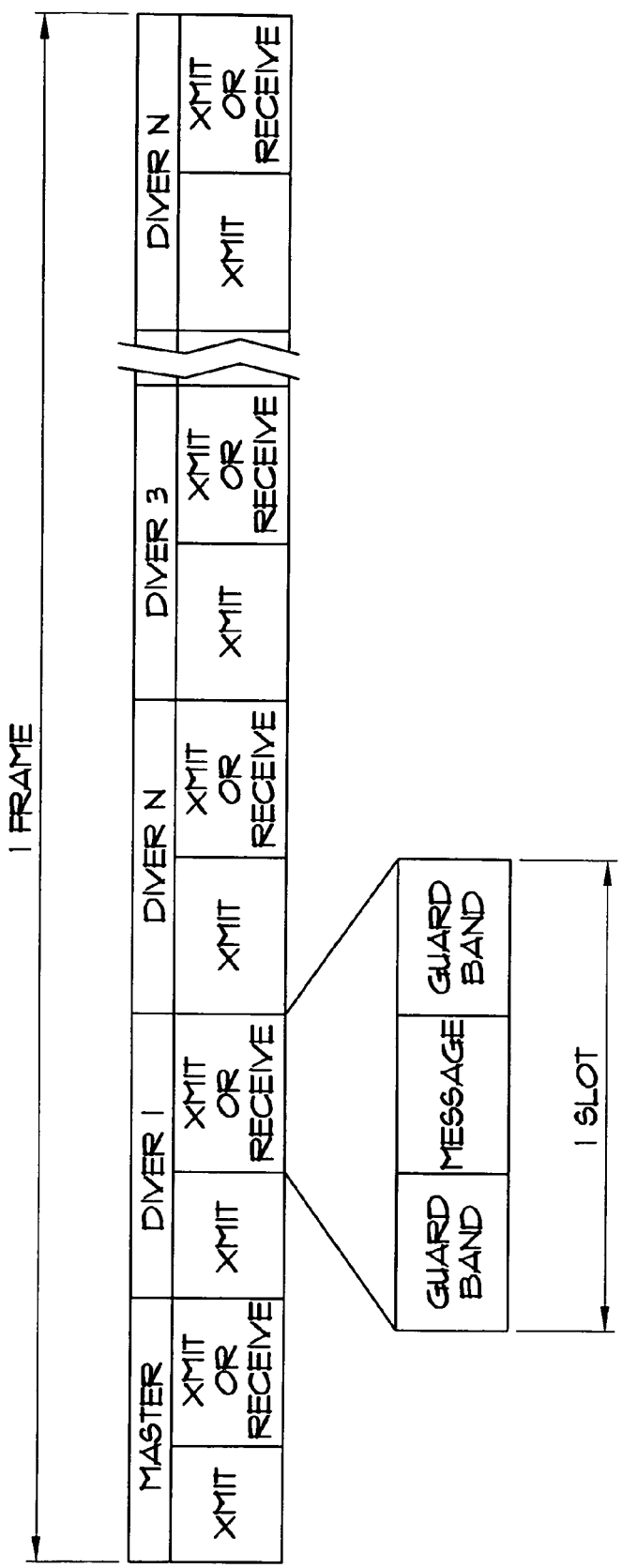
FIG. 6 illustrates an exemplary time division multiple access scheme for underwater communication.

FIG. 6 illustrates the frame structure of a TDMA frame accommodating n diver units 100. The frame is divided into 2 n slots of 20 msec duration each, where n is the number of diver units 100. One diver unit 100 is designated as the master diver unit 100 and controls communications. The master unit may be selected, for example, by choosing the one with the highest or lowest unit ID. The master diver unit 100 assigns timeslots to the other diver units 100. The first two time slots in the frame are reserved for the master diver unit 100. Each diver unit 100 controls the use of its allocated time slots. A diver unit 100 may use its first timeslot to transmit a request message to a beacon unit 50 or other diver unit 100, and its second timeslot to receive a response message from the beacon unit 50 or other diver unit 100.

FIG. 6 also illustrates the slot format. Within each time slot, there is a guard band at the beginning and end of the time slot. Those skilled in the art will appreciate that propagation delays may result in the transmission of one diver unit overlapping the time slot of another diver unit 100. The guard bands are preferably wide enough to account for overlapping signals due to propagation delay. The remaining time within each time slot is used to transmit message data. In one embodiment of the invention, each time slot is used to transmit or receive one message. However, those skilled in the art will appreciate that multiple messages could be transmitted in a single time slot if the duration of messages is short relative to the slot period. Conversely, if the message length is greater than the slot period, a message could be segmented and transmitted over multiple slots.

Figure 7:
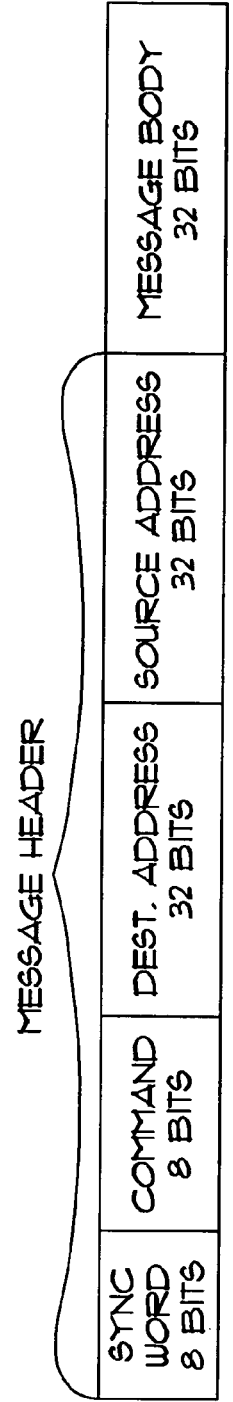
FIG. 7 illustrates an exemplary message format for underwater communications.

An exemplary message format is shown in FIG. 7. A message includes a message header and a message body. The message header includes a sync word (8 bits), command (8 bits), destination address (32 bits), and source address (32 bits). The sync word is a known bit pattern used to indicate the start of a message. The command element indicates the message type to the receiving unit. If a message spans multiple time slots, the command element could be used to indicate whether the message data contained in the current slot is a continuation of the message transmitted in the previous slot. The destination address indicates the intended recipient of the message. The source address element indicates the sender of the message.

As shown in FIG. 6, the diver units 100 transmit in a predetermined sequence. In this exemplary embodiment, only diver units 100 have assigned slots. Beacon units 50 transmit only in response to the diver units in the second slot after receiving a message from the diver unit 100. In other embodiments, beacon units could also be assigned slots and initiate communications with diver units 100. Before communications begin, the master diver unit 100 establishes the transmit order and notifies the other diver units 100 of their place in the sequence. During an initialization procedure, the master diver unit 100 transmits an initialization message to the other diver units 100 that identifies the preceding diver unit 100 in the sequence. The other diver units 100 acknowledge the initialization message. During normal operations, each diver unit 100 listens for the address of the preceding diver unit 100, which can be determined by the source address element of the messages transmitted using slot 1, and the source address or destination address of messages using slot 2.

A problem may arise when an obstruction blocks signals between two diver units 100 that transmit consecutively. In this situation, the second diver unit 100 may not be able to "hear" communications from the first diver unit 100. One consequence is that communications will stall because the second diver unit 100 will not transmit. In this situation, the master diver unit 100 may restart a transmit sequence if no signals are detected within a predetermined period of time. If the communications continue to stall, the master diver unit 100 can invoke the initialization procedure to change the transmit order. If changing the transmit order does not solve the problem, the diver unit 100 that is stalling the communications can be dropped from the transmit sequence.

Underwater communications between the diver units 100 and beacon units 50 occur at sonar frequencies. In the exemplary embodiment, the carrier frequency is 200 kilohertz and the bit period is 0.06 msecs (60 μsec), which equates to a data transmission rate of approximately 16.67 kbps. A message comprises a total of 112 bits. Thus, it takes 6.72 msec to transmit the message.

Figure 8:
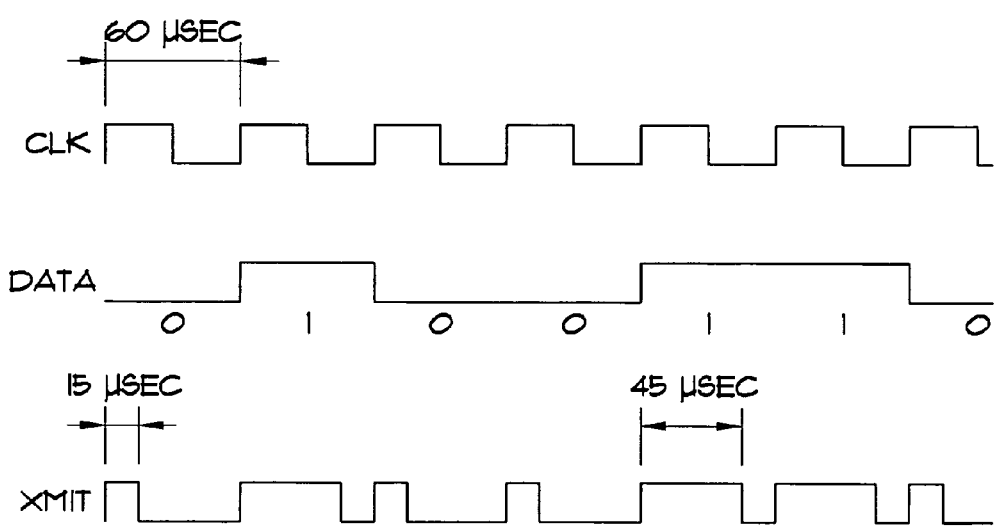
FIG. 8 illustrates an exemplary modulation scheme for underwater communications

FIG. 8 illustrates how data is modulated onto a carrier frequency. FIG. 8 illustrates a clock signal, data signal, and modulation signal. The clock signal has a period of 60 μsec, which is equal to the bit period. The data signal represents binary data that is being transmitted. The modulation signal comprises a pulse train at the same frequency as the clock signal. The pulse width of a given pulse in the modulation signal is determined by the state of the data signal. When the data signal is low, a relatively short pulse is generated to indicate a "0" bit. Conversely, when the data signal is high, a relatively long pulse is generated to indicate a "1" bit. In the exemplary embodiment, the short pulses indicative of a 0 bit are 15 microseconds in duration and the long pulses indicative of a 1 bit are 45 microseconds. On/Off keying is used to modulate the carrier. The carrier is turned on when the modulation signal is high, and is turned off when the modulation signal is low. The receiver samples the signal 37 microseconds after detecting the rising edge of a pulse to detect the signal. In an alternative embodiment, a variable sampling time after detection of the rising edge may be used to compensate for variations in the clock rate at the transmitter. More particularly, the receiving unit may measure the time between rising edges of the pulses in the received signal to determine the period of the transmitter clock and adjust the sampling time accordingly. The measurement of the clock period may be performed when the sync word is being transmitted. In one exemplary embodiment, the sampling time $T_s$ is determined by multiplying the transmit clock period by 0.625.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

The invention claimed is:
1. An underwater navigation system comprising:
  a surface unit adapted to float on the surface when deployed, said surface unit including:
    a receiver to receive navigation signals from earth-orbiting satellites, a sonar transceiver to communicate with to sub-surface beacon units and to transmit location information to said sub-surface beacon units;

processing circuits to determine a location of the surface unit based on said navigation signals and to generate a control signal for sinking or destroying said surface unit after transmitting location information to one or more beacon units;

a plurality of beacon units adapted to sink to the sea floor when deployed, each said beacon unit including:

processing circuits to determine the location of the beacon unit based on location information received from the surface unit; and a sonar transceiver to receive said location information from said surface unit while the surface unit is floating on the surface; and to transmit location information to a diver unit to provide navigation assistance to the diver unit.

2. The underwater navigation system of claim 1 wherein the receiver comprises a Global Positioning System receiver.

3. The underwater navigation system of claim 1 wherein the surface unit further comprises a relay responsive to the control signal from the processing circuits for sinking or destroying the surface unit.

4. The underwater navigation system of claim 1 wherein each beacon unit determines its location based on its distance from at least one surface unit.

5. The underwater navigation system of claim 4 wherein each beacon unit determines its location by triangulation based on its distance from a plurality of surface units.

6. The underwater navigation system of claim 4 wherein each beacon unit determines its location based on its direction and distance from at least one surface unit.

7. The underwater navigation system of claim 4 wherein the beacon units determine distance from the surface unit based on the time of arrival of a signal transmitted by the surface unit.

8. The underwater navigation system of claim 4 wherein the beacon units determine distance from the surface unit based on the time of travel of a signal transmitted by the surface unit.

9. The underwater navigation system of claim 4 wherein the beacon units determine distance from the surface unit based on the received power of a dual-tone signal.

10. The underwater navigation system of claim 4 wherein the beacon units includes a plurality of sonar transducers, and wherein the processing circuits determine direction to the surface unit based on the time difference of arrival of a signal transmitted by the surface unit at said plurality of sonar transducers.

11. The underwater navigation system of claim 1 wherein the beacon units include an inactive mode and an active mode of operation.

12. The underwater navigation system of claim 11 wherein the beacon units switch from an inactive mode to an active mode of operation responsive to receipt of and activation code.

13. The underwater navigation system of claim 11 wherein the beacon units switch from an active mode to an inactive mode of operation responsive to receipt of and deactivation code.

14. The underwater navigation system of claim 11 wherein the beacon units switch from an active mode to an inactive mode of operation after a determined period has elapsed without receiving a communication.

15. A method of underwater navigation comprising:
receiving navigation signals from earth-orbiting satellites by a surface unit floating on the surface of a body of water;
determining location of the surface unit by an on board processing circuit in said surface unit;
transmitting location information from said surface unit to a sub-surface beacon unit; and
sinking or destroying said surface unit after transmitting location information to said sub-surface beacon unit.

16. The method of claim 15 further comprising:
receiving location information transmitted by said surface unit at said beacon unit; and
determining the location of the beacon unit based on location information received from the surface unit;
transmitting location information to a diver unit to provide navigation assistance to the diver unit.

17. The method of claim 15 wherein the beacon unit determines its location based on its distance to the surface unit.

18. The method of claim 17 wherein the beacon unit determines its location based on its distance to a plurality of surface units.

19. The method of claim 17 wherein the beacon unit determines its location based on the direction and distance to the surface unit.

20. The method of claim 17 wherein the beacon unit determines distance to the surface unit based on the time of arrival of a signal transmitted by the surface unit.

21. The method of claim 17 wherein the beacon unit determines distance to the surface unit based on the time of travel of a signal transmitted by the surface unit.

22. The method of claim 17 wherein the beacon unit determines distance to the surface unit based on the received power of a dual-tone signal.

23. The method of claim 15 wherein the beacon unit determines direction to the surface unit based on the time difference of arrival of a signal transmitted by the surface unit at said plurality of sonar transducers disposed on the beacon unit.

24. The method of claim 15 wherein the beacon units switch between an inactive mode and an active mode of operation.

25. The method of claim 24 wherein the beacon unit switches from an inactive mode to an active mode of operation responsive to receipt of an activation code.

26. The method of claim 24 wherein the beacon unit switches from an active mode to an inactive mode of operation responsive to receipt of a deactivation code.

27. The method of claim 24 wherein the beacon unit switches from an active mode to an inactive mode of operation after a determined period has elapsed without receiving a communication.

28. The method of claim 16 wherein said beacon unit further uses information received from another beacon unit in addition to information received from said surface unit to determine its location.

29. The method of claim 15 wherein said surface unit calculates the location of a beacon unit and transmits the location to the beacon unit.

* * * * *